United States Patent [19]

Aw

[11] Patent Number: 5,150,127
[45] Date of Patent: Sep. 22, 1992

[54] PORTABLE RADAR SIMULATOR

[75] Inventor: Kenneth Aw, Camarillo, Calif.

[73] Assignee: The United States of America as represented by the Secretary of the Navy, Washington, D.C.

[21] Appl. No.: 878,593

[22] Filed: May 5, 1992

[51] Int. Cl.$^5$ ............................................. G01S 7/40
[52] U.S. Cl. ................................... 342/169; 342/170
[58] Field of Search ......................... 342/169, 170, 171

[56] References Cited

U.S. PATENT DOCUMENTS

| 3,683,381 | 8/1972 | Strenglein | 342/169 |
| 4,163,234 | 7/1979 | Beno et al. | 342/169 |
| 4,666,407 | 5/1987 | Jones | 342/169 X |
| 4,694,299 | 9/1987 | Huntley | 342/170 |
| 5,010,342 | 4/1991 | Jones, Jr. | 342/169 |

Primary Examiner—Mark Hellner
Attorney, Agent, or Firm—David S. Kalmbaugh; Melvin J. Sliwka

[57] ABSTRACT

A portable radar simulator which when connected to a transmitting means such as a waveguide horn antenna provides a radar signal to test a radar receiver. The portable radar simulator comprises a tunable oscillator which generates a continuous wave signal in the microwave frequency range with the desired frequency of the signal being selected by an operator. The signal generated by the tunable oscillator is supplied to a microwave switch. The microwave switch receives a control signal provided by a pulse repetition frequency generating circuit and in response to the control signal turns the switch on or off controlling the transmission of the oscillator generated signal to the wave guide horn antenna. The pulse repetition frequency generating circuit which comprises an integrated circuit timer and a monostable multivibrator provides a variable frequency and variable pulse width control signal. The frequency and pulse width of the control signal are, in turn, set by the operator.

11 Claims, 1 Drawing Sheet

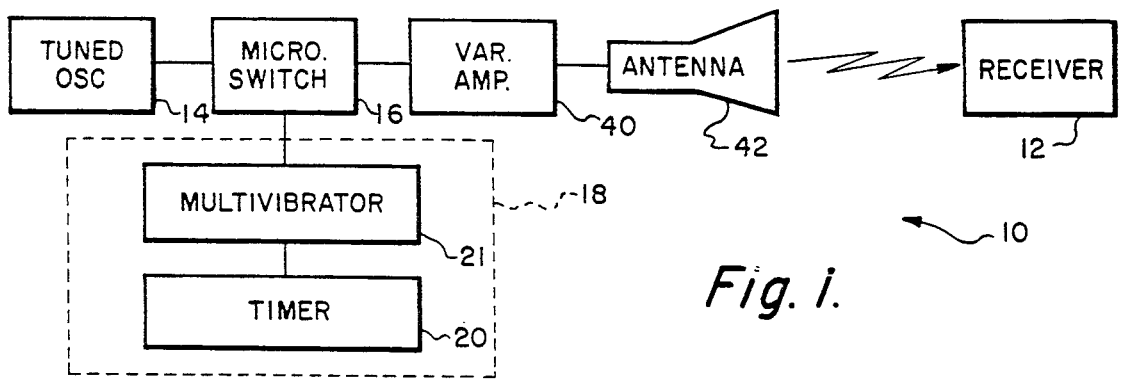
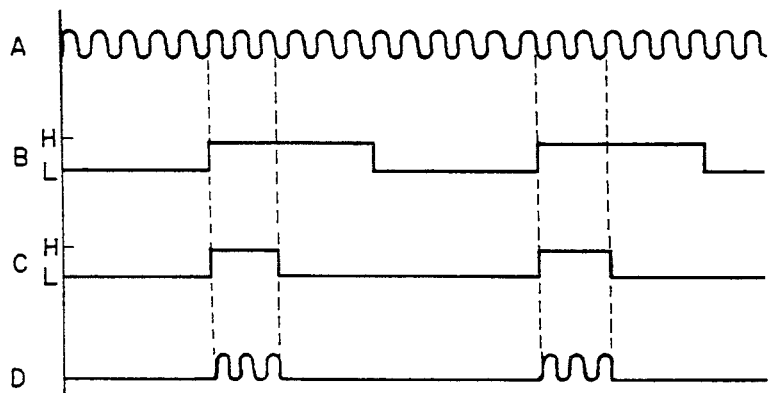
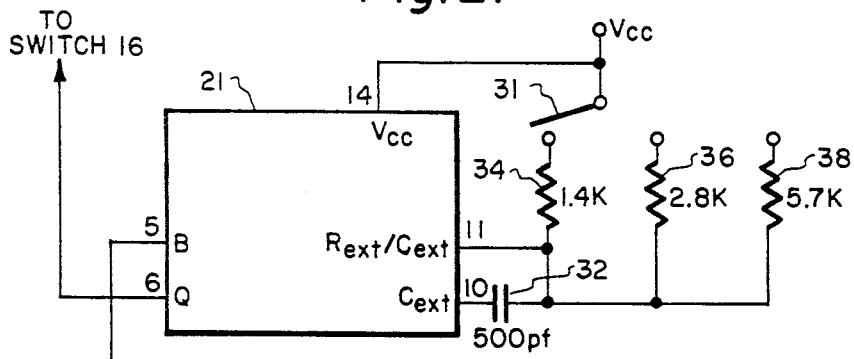
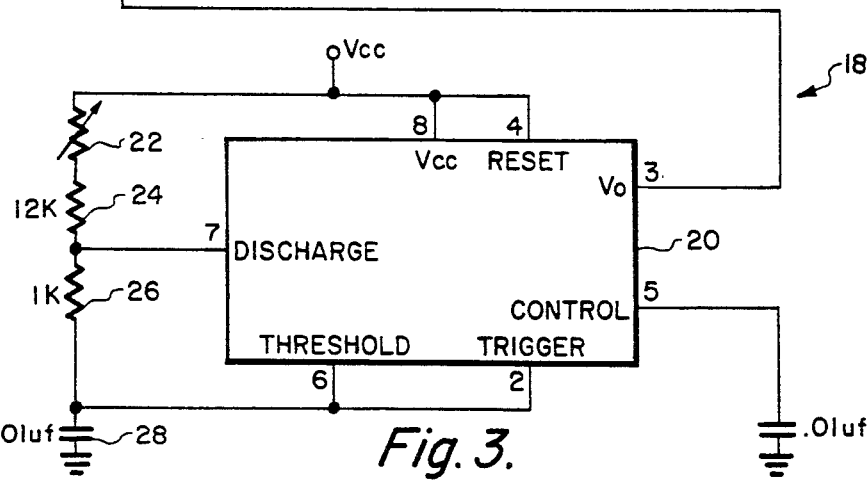

PORTABLE RADAR SIMULATOR

BACKGROUND OF THE INVENTION

1. Field of the Invention

The present invention relates generally to simulators. In particular, the present invention relates to a portable radar simulator which when connected to a microwave transmitter will generate pulsed signals of multiple pulse repetition frequencies for testing the sensitivity of a radar receiver.

2. Description of the Prior Art

Man has engaged in war on the land, in the sea, in the air and in the electromagnetic spectrum. The electromagnetic spectrum has been used by the military for improved communications, the guidance of aircraft and missiles and the navigation of ships and planes. A nation seeks control of the electromagnetic spectrum because of the military's increasing dependency on its use for surveillance of potential enemy forces, communications between military units, detection of enemy military forces and the guidance and control of aeroplanes and missiles. With a mystery of the electromagnetic spectrum an adversary could achieve an indispensable ingredient for conquering an enemy or discouraging a potential aggressor.

There are two types of electronic warfare equipment, active and passive. Active equipment radiates its own energy whereas passive equipment does not. The passive category includes reconnaissance or surveillance equipment that detects and analyzes the electromagnetic radiation that is produced by radar and communications transmitters aboard aircraft, missiles, ships, satellites and ground installations. The reconnaissance devices may be used to identify and map the location of the emitters without in any way altering the nature of the signal they receive.

Certain types of passive electronic warfare systems enhance or change the nature of the electromagnetic energy reflected back to the enemy radars without generating any signal of their own. Active electronic warfare systems generate energy or delay the received signals to confuse the enemy's electromagnetic sensors.

A radar warning receiver is a passive type of electronic warfare equipment which is not used over the entire range of the electromagnetic spectrum. The radar warning receiver alerts the pilot or ship's captain that his aircraft or ship is being illuminated by a specific radar signal. Once the pilot or captain has been alerted that his vehicle has been detected by radar he can maneuver his vehicle to evade the threat or initiate certain electronic warfare countermeasures. Electronic warfare countermeasures include all actions taken by the pilot or ship's captain to nullify the effective operation of the enemy's electronic warfare equipment. Some electronic countermeasures used are jamming the enemy's signal, the dropping of chaff and the launching of decoys.

Electronic warfare equipment and in particular radar receivers on military aircraft are expensive, complex and difficult to test. In order to test such systems, and also to train operators on them, systems and techniques have been developed for simulating a field of radar signals which are applied to the receiver. A complete simulator is often complex requiring a very large amount of electronic equipment to simulate the radio frequency energy/radar signals applied to the receiver. In addition, prior art simulators often only test a portion of the receiver by providing a simplified partial simulation that is not a real life simulation. Another disadvantage of prior art simulators used to test radar receivers is that these simulators require highly trained and skilled operators to operate them.

Therefore, it is a primary object of the present invention to provide an apparatus for generating radar signals at different frequencies over a given frequency range, without the limitations of the prior art simulators discussed above in a real life simulation of an environment of electromagnetic signals and a realistic verification of radar receiver sensitivity.

SUMMARY OF THE INVENTION

The present invention overcomes the disadvantages of the prior art including those mentioned above in that it comprises a relatively simple yet highly efficient portable radar simulator which when connected to a transmitting means such as a waveguide horn antenna provides a radar signal to test a radar receiver of the like. The portable radar simulator of the present invention comprises a tunable oscillator which generates a continuous wave signal in the microwave frequency range with the desired frequency signal being selected by an operator. The signal generated by the tunable oscillator is supplied to a microwave switch. The microwave switch also receives a control signal provided by a pulse repetition frequency generating circuit and in response to the control signal turns the switch on or off controlling the transmission of the oscillator generated signal to the wave guide horn antenna. The pulse repetition frequency generating circuit which comprises an integrated circuit timer and a monostable multivibrator provides a variable frequency and variable pulse width control signal. The frequency and pulse width of the control signal are, in turn, set by the operator. Further, an amplifier is electrically connected between the microwave switch and the wave guide horn antenna to provide power enhancement of the signal supplied to the wave guide horn antenna.

BRIEF DESCRIPTION OF THE DRAWINGS

FIG. 1 is an electrical block diagram of the portable radar simulator constituting the present invention;

FIG. 2 is a graphical representation of the various signals which occur at the outputs of some of the electrical components of the simulator of FIG. 1; and FIG. 3 is a detailed electrical schematic of the pulse repetition frequency generating circuit of the present invention;

DETAILED DESCRIPTION OF THE PREFERRED EMBODIMENT

The preferred embodiment of the present invention will now be discussed in conjunction with all of the figures of the drawings.

Referring to FIG. 1, there is shown a portable radar simulator, designated generally as 10, for generating a microwave signal which may be used to test a radar receiver 12 or the like. Portable radar simulator 10 comprises a tunable oscillator 14 for providing a continuous wave signal, FIG. 2(A), having a frequency within a range of 8.0 gigahertz to 12.4 gigahertz. An operator selects the desired frequency for the continuous wave signal depending on the type of radar receiver being tested. The continuous wave signal is supplied to the signal input of a microwave switch 16 which functions as an on or off switch allowing the signal of FIG. 2(A) to pass there through when switch 16 is turned on by a control signal, FIG. 2(C) supplied to the control input of switch 16. The control signal of FIG. 2(C) is, in turn, generated by a pulse repetition frequency generating circuit, designated generally as 18.

The tunable oscillator 14 used in the preferred embodiment of the present invention is a Avantek YIG-tuned transistor oscillator, Model No. AV-7803, while the microwave switch 16 is a central Microwave Model FM864B single pole single throw microwave switch which is turned on by a logic one and turned off by a logic zero.

Pulse repetition frequency generating circuit 18 comprises an integrated circuit timer 20 which a generates a pulsed signal, FIG. 2(B) with a fifty percent duty cycle and a frequency which may be varied between approximately one kilohertz and ten kilohertz. The pulsed signal generated by timer 20 is supplied to the signal input of monostable multivibrator 21 which varies the pulse width of each pulse of the signal resulting in the control signal of FIG. 2(C) appearing at the output of multivibrator 21.

Referring to FIGS. 2 and 3, a series connected variable resistor 22 and a twelve K-ohm resistor 24 are electrically connected to the discharge terminal of timer 20. A one K-ohm resistor 26 is connected between the discharge terminal of timer 20 and the threshold input of timer 20, while a 0.01 $\mu f$ capacitor 28 is connected between ground and the threshold input of timer 20. The frequency of the pulsed signal generated by timer 20 is calculated in accordance with the following equations:

$$t_1 = 0.693 R_A + R_B) C_1 \quad (1)$$

$$t_2 = 0.693 R_B C_1 \quad (2)$$

$$T = t_1 + t_2 = 0.693 (R_A + 2R_B) C_1 \quad (3)$$

$$f = \frac{1}{T} = \frac{1}{0.693(R_A + 2R_B)C_T} \quad (4)$$

where $t_1$ is the high level output period of the pulsed signal, $t_2$ is the low level output period of the pulsed signal, $R_A$ is the value resistor 26, $R_B$ is the value of the series combination of resistors 22 and 24 and $C_1$ is the value of capacitor 28. The values of $t_1$ and $t_2$ are equal since the duty cycle for the pulse signal generated by timer 20 is fifty percent. A 200 K-ohm variable resistor was selected for resistor 22. By utilizing variable resistor 22, the frequency of the pulsed signal provided timer 20 may be varied within a frequency range of 673 hertz to 10.3 kilohertz.

The pulsed signal generated by timer 20 is supplied to the B input of multivibrator 21 which varies the pulse width of each pulse of the pulse signal of FIG. 2(B) resulting in the control signal of FIG. 2(B) appearing at the Q output of multivibrator 21. The pulse width of each pulse of the signal of FIG. 2(B) is varied in accordance with the following equation:

$$t_w 32\ 0.7 \cdot C_{ext} R_T \quad (5)$$

where $C_{ext}$ is the value of capacitor 30 and $R_T$ is the value of the external timing resistance for multivibrator 21 which depends on the position of switch 31. When, for example switch 31 is positioned so that power source $V_{cc}$ is electrically coupled through resistor 34 to the $R_{ext}/C_{ext}$ input of timer 21 and through the series combination of resistor 34 and capacitor 32 the pulse width of each pulse of the signal of FIG. 2(C) will be 0.5 microseconds. Similarly, when switch 31 is positioned so that power source $V_{cc}$ is electrically coupled through resistor 36 to the $R_{ext}/C_{ext}$ input of timer 21 and through the series combination of resistor 36 and capacitor 32 the pulse width of each pulse of the signal of FIG. 2(C) will be one microseconds. Likewise, when switch 31 is positioned so that power source $V_{cc}$ is electrically coupled through resistor 38 to the $R_{ext}/C_{ext}$ input of timer 21 and through the series combination of resistor 38 and capacitor 32 the pulse width of each pulse of the signal of FIG. 2(C) will be two microseconds.

The timer used in the preferred embodiment of the present invention is a National Semiconductor Model LM555 Timer, while the multivibrator is a Texas Instrument Model SN54121 monostable multivibrator.

Referring to FIGS. 1-3 the signal of FIG. 2(C) is supplied to the control input of switch 16 with switch 16 allowing the signal of FIG. 2(A) to pass through switch 16 when the control signal of FIG. 2(C) is at the logic one state resulting in the signal of FIG. 2(D) appearing at the output of switch 16. The signal of FIG. 2(D) is supplied to a tunable power amplifier 40 which increases the power level of the signal of FIG. 2(D) to allow for testing of receiver 12. The amplified signal of FIG. 2(D) is next supplied to waveguide horn antenna 42 which in response to the signal of FIG. 2(D) transmits a beam of pulsed microwave energy to radar receiver to test receiver 12.

The amplifier 40 selected for the preferred embodiment of the present invention was a Watkins Johnson 20 dBm tunable power amplifier Model WJ-8725, although it should be understood that any commercially available wide band low noise microwave amplifier which operates in the microwave frequency range (10 Ghz-18 Ghz) may be used as amplifier 42. Further, it should be noted that by utilizing a 20 dBm power amplifier with portable radar simulator 10 sufficient gain is provided to allow for testing of receiver 12 when receiver 12 is positioned up to sixty feet from the antenna 42 without unacceptable loss in signal strength. In addition, it should be noted that the waveguide horn antenna used in the preferred embodiment of the present invention is Demorany Bernardi Model 520 standard gain horn antenna, although it should be understood that any waveguide horn antenna which provides a gain of approximately 20 dB may be used as antenna 42.

From the foregoing, it may readily be seen that the present invention comprises a new, unique, and exceedingly useful portable radar simulator which constitutes a considerable improvement over the known prior art. Obviously, many modifications and variations are possible in light of the above teachings. It is, therefore, to be understood that within the scope of the appended claims that the invention may be practiced otherwise than as specifically described.

What is claimed is:

1. A portable radar simulator for measuring the sensitivity of a radar receiver, said radar simulator comprising:

signal generating means for providing a continuous wave signal, said signal generating means allowing for the adjustment of the frequency of said continuous wave signal within a first frequency range;

switching means for receiving said continuous wave signal from said signal generating means;

timing circuit means for providing a pulsed control signal with a fifty percent duty cycle, said timing circuit means allowing for the adjustment of the frequency of said pulsed control signal within a second frequency range;

multivibrator means for receiving said pulsed control signal and then adjusting the pulse width of each pulse of said control signal so as to set the pulse width of each pulse of said control signal for a predetermined time period;

said switching means in response to said pulsed control signal either inhibiting or passing therethrough said continuous wave signal; and antenna means adapted to receive that portion of the continuous wave signal passed through said switching means, said antenna means providing in response to said continuous wave signal a beam of pulsed microwave energy to said radar receiver for measuring the sensitivity of said radar receiver.

2. The portable radar simulator of claim 1 wherein said signal generating means comprises a Ytrain Iron Garnet tunable oscillator for generating said continuous wave signal with said continuous wave signal having a frequency range between approximately eight gigahertz and 12.4 gigahertz.

3. The portable radar simulator of claim 1 wherein said antenna means comprises a waveguide horn antenna.

4. The portable radar simulator of claim 1 further characterized by a power amplifier electrically connected between said switching means and said antenna means.

5. The portable radar simulator of claim 1 wherein said timing circuit means comprises:

an integrated circuit timer having a discharge terminal, a threshold input, a trigger input, and an output for providing said pulsed control signal to said multivibrator means, the threshold input of said timer being connected to the trigger input of said timer;

a direct current voltage source;

a first fixed resistor and a variable resistor connected in series, said first fixed resistor and said variable resistor being connected between the discharge terminal of said timer and said voltage source;

a second fixed resistor connected between said discharge terminal and the threshold input of said timer; and a first capacitor connected between ground and the threshold input of said timer.

6. The portable radar simulator of claim 5 integrated circuit timer generates said pulsed control signal, the frequency of said pulsed control signal being adjustable within a frequency range of 673 hertz to 10.3 kilohertz.

7. The portable radar simulator of claim 1 wherein said multivibrator means comprises:

a monostable multivibrator having a B signal input for receiving said pulsed control signal from said timing circuit means, a $R_{ext}/C_{ext}$ input, a $C_{ext}$ input and a Q output for providing said pulsed control signal to said switching means;

a direct current voltage source;

a second capacitor connected between the $R_{ext}/C_{ext}$ input and the $C_{ext}$ input of said monostable multivibrator; and third, fourth and fifth fixed resistors configured in parallel, each of said third, fourth and fifth fixed resistors having one end normally open; and an electrical switch connected to said direct current voltage source, said electrical switch being adapted to connect said direct current voltage source to the normally open end of either said third fixed resistor, said fourth fixed resistor or said fifth fixed resistor.

8. The portable radar simulator of claim 7 wherein said monostable multivibrator adjust the pulse width of each pulse of said control signal, the pulse width of each pulse of said control signal being adjustable to either one half microsecond, one microsecond or two microseconds depending upon whether said electrical switch electrically couples said direct current voltage source to the $R_{ext}/C_{ext}$ input and the $C_{ext}$ input of said monostable multivibrator through said said third fixed resistor of said fourth fixed resistor or said fifth fixed resistor.

9. A portable radar simulator comprising:

a tunable oscillator having an output;

a microwave switch having a signal input connected to the output of said tunable oscillator, a control input and an output;

a variable gain power amplifier having an input connected to the output of said microwave switch and an output;

a wave guide horn antenna having an input connected to the output of said amplifier;

an integrated circuit timer having a discharge terminal, a threshold input, a trigger input, and an output, the threshold input of said timer being connected to the trigger input of said timer;

a direct current voltage source;

a first fixed resistor and a variable resistor connected in series, said first fixed resistor and said variable resistor being connected between the discharge terminal of said timer and said voltage source;

a second fixed resistor connected between said discharge terminal and the threshold input of said timer;

a first capacitor connected between ground and the threshold input of said timer;

a monostable multivibrator having a B signal input connected to the output of said timer, a $R_{ext}/C_{ext}$ input, a $C_{ext}$ input and a Q output connected to the control input of said switch;

a second capacitor connected between the $R_{ext}/C_{ext}$ input and the $C_{ext}$ input of monostable multivibrator;

third, fourth and fifth fixed resistors configured in parallel, each of said third, fourth and fifth fixed resistors having one end normally open; and an electrical switch connected to said direct current voltage soruce, said electrical switch being adapted to connect said direct current voltage source to the normally open end of either said third fixed resistor, said fourth fixed resistor or said fifth fixed resistor.

10. The portable radar simulator of claim 9 wherein said tunable oscillator comprises a Ytrain Iron Garnet tunable oscillator for generating a continuous wave signal with said continuous wave signal having a frequency range between approximately eight gigahertz and 12.4 gigahertz.

11. The portable radar simulator of claim 9 wherein said integrated circuit timer provides a pulsed signal, the frequency of said pulsed signal being adjustable within a frequency range of 673 hertz to 10.3 kilohertz.

* * * * *